United States Patent

Carlson, Jr.

[15] 3,699,219

[45] Oct. 17, 1972

[54] METHOD OF ADMINISTERING AMINO ACIDS TO CONVALESCING LIVESTOCK AND COMPOSITION THEREFOR

[72] Inventor: Arthur Carlson, Jr., Overland Park, Kans.

[73] Assignee: Haver-Lockland Laboratories, Shawnee, Kans.

[22] Filed: July 15, 1969

[21] Appl. No.: 545

Related U.S. Application Data

[63] Continuation of Ser. No. 551,910, May 23, 1966.

[52] U.S. Cl. .................................. 424/14, 424/177
[51] Int. Cl. ....................... A61k 9/00, A61k 27/00
[58] Field of Search ................... 424/22, 177, 14

[56] References Cited

UNITED STATES PATENTS

| | | |
|---|---|---|
| 2,498,687 | 2/1950 | Larsen ..................... 424/195 |
| 3,056,724 | 10/1962 | Marston ................... 423/22 |
| 3,212,902 | 10/1965 | Bavisotto .................. 99/9 |
| 3,293,132 | 12/1966 | Stoyle et al. ............ 424/280 |

OTHER PUBLICATIONS

Veterinary Drug Encyclopedia (T), p. 121 1965

*Primary Examiner*—Sam Rosen
*Attorney*—Schmidt, Johnson, Hovey & Williams

[57] ABSTRACT

A method of administering amino acids to convalescing livestock. Specifically, a method of administering amino acids to livestock unable to eat a normal diet is provided whereby the amino acids may be administered as a bolus using a conventional balling gun. The amino acid-containing bolus is of a size and composition large enough to contain a significant amount of an animal's minimum daily requirement of amino acids and to disintegrate in the stomach of the animal at approximately the rate of usage thereof by the animal yet small enough to permit introduction into the throat without gagging the animal.

8 Claims, No Drawings

METHOD OF ADMINISTERING AMINO ACIDS TO CONVALESCING LIVESTOCK AND COMPOSITION THEREFOR

This application is a continuation of my application Ser. No. 551,910 filed May 23, 1966.

This invention relates to a novel method and composition for supplying dietary supplements to animals which refuse or are unable to eat a normal diet and, more particularly, relates to a supplement capable of providing a significant quantity of amino acids to convalescing livestock as well as to a process for efficiently administering the supplement in the form of a bolus to such livestock.

Tissue protein in the body of an animal undergoes continuous decomposition and reconstruction. The reconstruction process is assisted by providing the animal with a supply of feed protein which is hydrolyzed by the metabolism of the body into amino acids which are then distributed throughout the body and serve as building blocks in the construction of tissue proteins. A healthy animal is said to be in nitrogen balance when the intake of amino acid source or feed protein is substantially equal to the tissue protein which is irreversibly decomposed by the natural catabolic processes of the body. The generally accepted value for the recommended daily amino acid intake by a healthy animal is approximately 1 gram of balanced amino acids for each kilogram of body weight. Normally, sick and convalescing animals require still larger amounts.

In addition, sick and convalescing animals need large quantities of amino acids to repair disease damaged tissue. Complicating the process of administering such excess amino acids to sick and convalescing animals is the fact that the body of an animal has no means for storing amino acids as such.

The liver serves as a clearing house and distribution center for amino acids in the body system of an animal. An amino acid is deaminated and metabolized by the liver to form ammonia and 2, 3, 4, 5, and 6 carbon sugars. These sugars are then either reunited with ammonia to form amino acids; converted in accordance with Kreb's cycle reactions into energy; formed into catalysts via Kreb's cycle reactions; or deposited as in the animal's body as glycogen. Whenever the body needs a certain amino acid, appropriate sugars, if present in the liver, undergo recombination with ammonia to form such amino acid which is then released by the liver and transported through the body system by plasma proteins such as albumen.

The activities of the liver other than the function of forming needed amino acids, operate to deplete the supply of sugars and ammonia available therein and render such chemicals unavailable for reaction. Thus, it has been found that for the most efficient utilization of amino acids, the latter should be supplied to the liver of an animal continuously and at approximately the rate of usage by the liver in supplying the system with amino acids for building tissue protein. It is manifest that in those cases where an animal is "off its feed" for any reason, the insufficient dietary intake results in further deficiency of essential amino acids. As the amount of essential amino acids decrease in the animal's system, its ability to combat the illness or condition is impaired. Since the animal is not eating at all or very poorly, it is obvious that addition of amino acid compositions to the animal's feed is not the answer.

One previous method for supplying amino acids to a sick or convalescing animal was to administer an amino acid solution parenterally; however, if one should attempt to supply the need by intravenous injection of the usual 5 percent solution at the recommended safe rate of 15 to 20 grams per hour, it would take 22 to 30 hours to supply the 9 liters or so of solution required to provide a 1,000 pound animal with the minimum recommended daily dosage of 1 gm per kilogram. Needless to say, this method required professional skill, and was too expensive and time-consuming to be practical.

Another method previously used was to pump solutions of amino acids into the rumen by means of a stomach pump. This method also required professional skill and equipment and therefore, was impractical from a convenience standpoint, as well as an economical point of view.

It is, therefore, the primary object of this invention to provide a composition for supplementary supply of amino acids to convalescing animals such as livestock in an economical and convenient form so that the same may be administered efficiently and easily by a layman having only ordinary skill in the art of raising livestock.

As a corollary to the foregoing object, it is an important aim of the instant invention to provide a composition for supplying needed amino acids to convalescing livestock and which preferably takes the form of an elongated bolus which has been compressed tightly to the end that the composition may be orally administered to a sick animal by a layman and with the bolus being characterized by the property of slowly disintegrating in the gastrointestinal tract of the animal to provide a continuous supply of amino acids to the system of the animal at a relatively slow rate.

Another important object of the instant invention is to provide a process for administering amino acids to sick and convalescing animals wherein the amino acids are combined with a binder therefor and compressed into a relatively large bolus permitting a significant amount of the animal's minimum daily requirement of amino acids to be forced down the throat of an animal and deposited in the gastrointestinal tract thereof in the form of a slowly disintegrable densified mass.

A further important object of the instant invention is the provision of such a process wherein the bolus described above is of a size whereby the same may be inserted into a balling gun and introduced into the animal's gastrointestinal tract to the end that the bolus may be deposited in the tract in whole condition.

Amino acids cannot be converted into a particular protein unless all of the required amino acids of that particular protein are present in the required amounts. Even if a deficiency of one is relieved, another deficient one will be a limiting factor. Thus, the only practical way to prevent an amino acid deficiency is to provide a surplus of all of the essential ones, thereby causing part of them to be burned to short chain sugars and ammonia and with the body then rearranging them into nonessential amino acids. The hydrolysates of naturally occurring proteins have been found especially useful to insure an adequate supply of all of the essential amino acids.

In particular, casein hydrolysate is a preferred source of animal derived amino acids because the hydrolysate contains a proper balance of amino acids and additionally, casein is readily obtained from milk. Yeast hydrolysate is a preferred source of vegetable derived amino acids for much the same reasons. It has been found that a material comprising a mixture of casein hydrolysate and yeast hydrolysate in a ratio of approximately 470 parts of the former to 77 parts of the latter presents a desirable blend of amino acids, peptides and polypeptides, for use in supplementing the diet of a sick or convalescing animal. Soybean or other vegetable protein hydrolysates may be substituted for the yeast hydrolysate with substantially equal results.

The ability of amino acids to supplement an animal's natural diet is enhanced when electrolytes such as sodium, potassium, calcium, and magnesium in their various salt forms are present. The cations of potassium and magnesium are of particular value because it is known that they accompany amino acids into the intracellular tissue spaces during anabolism and then again accompany the amino acids into the extracellular spaces when catabolism prevails. Additionally, sodium and calcium are known to be the major cations of the extracellular spaces.

Vitamins and readily metabolized carbohydrates such as dextrose may be added to the supplement as desired to further enhance the efficacy thereof. Sick and convalescing animals are generally in need of vitamins and a quick source of energy. When these components are included, the animal generally responds to treatment more quickly.

A binder in the nature of fuller's earth, stearic acid, sorbitol, lactose, corn starch, microcrystalline cellulose or mixtures of these substances is admixed with the amino acid containing material and the admixture tightly compressed in a mold to produce a densified, dimensionally stable bolus. The ratio of amino acid food material to binder may be approximately 4 to 6 parts by weight of food material for each part by weight of binder. The bulk density of the bolus is preferably sufficiently high so that the same will have a disintegration time of approximately 2 hours and 10 minutes when tumbled in a container of water at room temperature in accordance with the USP method set out in USP XVII at pages 919-921. By providing a densified bolus having a disintegration time as set forth above, it has been found that such bolus will provide a reasonably continuous supply of amino acids to the system of the animal at a controlled rate for most efficient utilization of the amino acids by the animal. The bolus should weigh approximately 30 to 32 grams and include about 18 to 22 grams of the food source material comprising approximately 16 to 18 grams of casein hydrolysate and about 2 to 4 grams of yeast hydrolysate with the binder comprising approximately 1.9 to 2.2 grams of fuller's earth, approximately 1.1 to 1.3 grams of steric acid, and about 1.0 to 1.1 grams of microcrystalline cellulose.

A bolus of preferred properties and embodying the principles of the instant invention may be produced as follows: Approximately 470 kilograms of casein protein hydrolysate (N-Z Amine BT), along with about 77 kilograms of yeast hydrolysate (Type M), is thoroughly mixed with 135 kilograms of dextrose (Clinton Brand A), 3.600 kilograms of potassium chloride (Muriate of potash, chemical grade), 7.200 kilograms of calcium lactate powder (Food Processing grade), 1.080 kilograms of magnesium carbonate powder (NF XII), and 13.500 kilograms of granular sodium chloride (USP).

One-tenth of the foregoing mixture (70.738 kilograms) is blended with 4.500 liters of 99 percent isopropyl alcohol and granulated using a No. 8 screen. The resultant granules are dried by conventional methods at a temperature of below 120° F.

The ten batches of dried granules are recombined and placed in a large ribbon blender along with 55.600 kilograms of 60/90 mesh fuller's earth (AA-RVM), 31.800 kilograms of stearic acid (Technical grade) and 27.800 kilograms of microcrystalline cellulose (Avicel). The resultant composition is mixed well in the blender. Approximately 822.580 kilograms of the uncompressed composition is thus produced.

Approximately 30.826 grams of the composition is compressed to form an oblong bolus approximately 3 inches long by 27/32 inches wide and 25/32 inches high at its extreme dimensions and having rounded corners. The bolus is of a size for convenient administration to an animal without gagging and utilizing a conventional balling gun having a tube portion presenting a chamber only slightly larger in size than the dimensions of the bolus and reciprocably receiving an ejection piston therein. The chamber has an open end opposite to the piston so that the tube containing the bolus may be inserted through the mouth and into the throat of the animal and upon manual operation of the piston, the bolus may be ejected from the gun and deposited in whole condition in the gastrointestinal tract of the animal where slow disintegration will occur to provide a needed supply of amino acids to the animal. After the bolus is ejected from the gun, the latter is withdrawn from the animal's mouth.

The recommended dosage of a product of the composition and size above is one bolus per 250 pounds of body weight, two or three times per day. Each bolus contains a sufficient quantity of material to provide at least approximately 15 grams of amino acid therein. It has been found that this dosage, while not only economical, results in highly efficient utilization of the amino acids and increased recovery rates for sick and convalescing animals. It is apparent that larger numbers of the boluses may be administered daily if desired or needed and particularly in those instances where economical considerations warrant or permit such higher dosages. Also, by practicing the principles of the instant invention, it is possible for a layman to administer a realistic dosage of amino acids to a sick or convalescing animal without the aid of a veterinarian, in a highly practical and efficient manner heretofore unknown.

Having thus described the invention, what is claimed as new and desired to be secured by Letters Patent is:

1. An oral dietary product for treating convalescing livestock comprising:

an elongated veterinary bolus comprised principally of an amino acid source food material selected from the group consisting of an animal derived protein hydrolysate, a vegetable protein hydrolysate, and mixtures thereof, and a binder therefor, and said bolus being in compressed form and having a bulk density sufficiently high to cause the bolus to continuously disintegrate when tumbled in an aqueous medium for about 2 hours and 10 minutes and containing at least about 15 grams of said source food material to provide a significant amount of the animal's minimum daily requirement of balanced amino acids.

2. The oral dietary product of claim 1, wherein said binder includes fuller's earth, stearic acid and microcrystalline cellulose.

3. The oral dietary product of claim 2, wherein said animal derived protein hydrolysate is casein hydrolysate and said vegetable protein hydrolysate is yeast hydrolysate.

4. The oral dietary product of claim 3, wherein there is provided approximately 4 to 6 parts by weight of said food material for each part by weight of said binder included therein.

5. The oral dietary product of claim 1, wherein said bolus weighs approximately 30 to 32 grams and includes about 18 to 22 grams of hydrolysate.

6. The oral dietary product of claim 1, wherein said bolus weighs approximately 30 to 32 grams and includes about 18 to 22 grams of said material comprising approximately 16 to 18 grams of casein hydrolysate and about 2 to 4 grams of yeast hydrolysate, said binder comprising approximately 1.9 to 2.2 grams of fuller's earth, approximately 1.1 to 1.3 grams of stearic acid, and about 1.0 to 1.1 grams of microcrystalline cellulose.

7. A method of treating convalescing livestock comprising the steps of:
   introducing an elongated veterinary bolus in whole form through the mouth and directly into the gastrointestinal tract of the afflicted animal, said bolus being comprised principally of an amino acid source food material selected from the group consisting of an animal derived protein hydrolysate, a vegetable protein hydrolysate, and mixtures thereof, and a binder therefor,
   said bolus being in compressed form, containing at least about 15 grams of said source food material and having a bulk density sufficiently high to cause the bolus to continuously disintegrate when tumbled in an aqueous medium for about 2 hours and 10 minutes, and
   administering a sufficient number of said boluses at each treatment period of the animal to provide at least about 15 grams of said material for each 250 pounds of body weight of the animal being treated.

8. A method as set forth in claim 7 wherein there is included the steps of administering said boluses to the afflicted animal two to three times a day.

* * * * *

PO-1050
(5/69)

UNITED STATES PATENT OFFICE
CERTIFICATE OF CORRECTION

Patent No. 3,699,219        Dated   October 17, 1972

Inventor(s) Arthur Carlson, Jr.

It is certified that error appears in the above-identified patent and that said Letters Patent are hereby corrected as shown below:

The name of the Assignee of this Patent should be identified as "HAVER-LOCKHART LABORATORIES" and the Serial Number of the continuation application should be listed as "849,545".

Signed and sealed this 1st day of May 1973.

(SEAL)
Attest:

EDWARD M. FLETCHER, JR.        ROBERT GOTTSCHALK
Attesting Officer               Commissioner of Patents